United States Patent Office

2,846,428
Patented Aug. 5, 1958

2,846,428

SEPARATION OF OPTICAL ANTIPODES WITH UREA

Wilhelm Schlenk, Mannheim-Feudenheim, Germany, assignor to Badische Anilin- & Soda-Fabrik Aktiengesellschaft, Ludwigshafen am Rhine, Germany No Drawing. Application August 11, 1954
Serial No. 449,255

Claims priority, application Germany May 8, 1952

7 Claims. (Cl. 260—96.5)

This invention relates to a new and improved method of separating optical antipodes.

The separation of racemic mixtures into their two different optically active components offers considerable difficulties in chemical practice. Mechanical sorting of the enantiomorphic crystal individuals being impracticable in commercial scale processes, it has been necessary to find out suitable optically active substances for each particular case which react with the antipodes to form compounds, as for example salts, amides, esters, or complex compounds, which unlike the antipodes themselves, do not behave as image and mirror-image and as a result are separable from each other by reason of their different physical properties. The auxiliary substances chiefly used in this separation technique are alkaloids or other optically active natural substances, which for their high cost are a major disadvantage in commercial operation.

I have now found that optical antipodes can be separated by bringing together the racemic mixture with substances which form therewith inclusion compounds, the inclusion lattice belonging to one of the 15 symmetry classes ($C_1$, $C_s$, $C_2$, $C_{2v}$, $D_2$, $S_4$, $C_4$, $D_{2d}$, $D_4$, $C_3$, $D_3$, $C_6$, $D_6$, T and O) without a center of symmetry. By inclusion lattice I mean the crystal lattice existing in the presence of the compounds to be included, which lattice often shows a spiral asymmetrical arrangement of the molecules. These lattices form inclusion compounds which preferentially contain molecules of the d-form or the l-form. By splitting up these inclusion compounds, the respective dextro- or laevo-rotatory antipodes can be recovered.

A substance which is especially suitable for the production of such inclusion compounds is urea. It is known that urea forms addition compounds with certain substances (Liebigs Annalen der Chemie, 565, 204 (1949)) and that mixtures of substances may thus be split up. The inclusion compounds according to the present invention are formed in a corresponding way. The urea is added to the mixture to be separated in the solid form or dissolved, for example, in methyl alcohol. The crystals which separate are split up into their components in known manner, as for example by treatment with methyl alcohol or water.

Whether in any given case it is mainly inclusion compounds which separate as crystals containing the dextro-rotatory or the laevo-rotatory form of the antipodes depends on the first formation of nuclei. By inoculation of the saturated solution with crystals of a urea adduct of an optically active compound, it is possible to accelerate the formation of crystals which contain predominantly the dextro- or the laevo-rotatory inclusion component. It is good practice to provide for the crystallization proceeding slowly.

By adding further amounts of the substance forming the inclusion compounds, as for example urea, to the mother liquor, fresh inclusion compounds can be separated which may be united with the first precipitate for working up. The oppositely-rotatory antipode gradually becomes enriched in the mother liquor and can be separated therefrom in the form of an inclusion compound, preferably after inoculation with a corresponding crystal.

The following examples will further illustrate this invention but the invention is not restricted to these examples. The parts are parts by weight.

*Example 1*

20 parts of a racemic mixture of 2-chloroctane (rotation O) are mixed with 100 parts of a saturated methyl alcoholic solution of urea. The precipitate which forms immediately is dissolved by gentle heating. The solution is then allowed to cool slowly to +7° C. An inclusion compound of urea and 2-chloroctane (8.5 parts) separates out from which the 2-chloroctane can be separated by treatment with water. It shows a specific rotation of $\alpha_D^{23} = +0.30°$. By appropriate inoculation further amounts of the dextro-rotatory antipode can be separated as an inclusion compound.

The other antipode of 2-chloroctane is enriched in the mother liquor. 2.6 parts of urea are added thereto while heating gently and it is then cooled during the course of 6 hours to about −6° C. 9.5 parts of an inclusion compound thus separate which on being split up with water yields a 2-chloroctane with the specific rotation $\alpha_D^{23} = -0.36°$. Further amounts of the laevo-rotatory antipode can be obtained by further addition of urea.

By frequent repetition of the urea treatment preparations are obtained in this way which finally consist to the extent of 96.5% of the dextro-rotatory or the laevo-rotatory 2-chloroctane.

*Example 2*

15 parts of a racemic mixture of the heptyl ester of α-chlorobutyric acid are dissolved in 100 parts of methanol and, after heating the solution to a temperature of 21° C., urea is added until the solution is just saturated with urea at the said temperature. Any small excess of urea is filtered off. The mixture is further heated to about 24° C. and then cooled down to 7° C. over a period of 20 hours while stirring slowly, 0.01 part of the (−)-2-chloroctane adduct obtained according to Example 1 being added as an inoculating agent at 22°, 21°, 20° and 19° C. After the lapse of 20 hours the crystal pulp precipitated (about 5 parts) is filtered off and dissociated by means of water. There are obtained about 1.25 parts of the heptyl ester of α-chlorobutyric acid which has a specific rotation of $\alpha_D^{23} = +1.52°$.

*Example 3*

20 parts of the racemic diamyl ester of malic acid are dissolved in 100 parts of methanol and the solution is saturated with urea at a temperature of 22° C. as described in Example 2. The mixture is further heated to about 25° C. and then cooled down to 6° C. over a period of 24 hours while stirring, 0.01 part of a urea adduct containing dextro-rotatory ($\alpha_D^{23} = +1.23°$) citronellyl caprinate being added as an inoculating agent at 23°, 22°, 21°, and 20° C. On dissociation of the adduct obtained there are obtained 6.2 parts of the diamyl ester of malic acid which has a specific rotation of $\alpha_D^{23} = -1.22°$.

As shown in the above examples, only about 8 to 31% of the racemic mixture is initially precipitated as urea inclusion compounds which contain predominantly one of the optical antipodes. The precipitate is then separated from the portion of the racemic mixture which remains in solution, thereby effecting a partial separation of the optical antipodes.

Examples of further substances which can be separated into their optically active components by the method according to my invention are:

2-chloroctane, 2-chlorononane, 2-chlorodecane, 2-chlorotridecane, 3-chlorononane, 3-chlorododecane, Decanol-3, dodecanol-3, The octyl ester of α-chloropropionic acid, the octyl ester of α-bromopropionic acid, The hexyl ester of lactic acid, the heptyl ester of lactic acid, the decyl ester of lactic acid, The heptyl ester of α-chlorobutyric acid, the decyl ester of α-bromobutyric acid, the heptyl ester of β-chlorobutyric acid, the octyl ester of α-methylbutyric acid, the octyl ester of α-hydroxy butyric acid, the heptyl ester of β-hydroxy butyric acid, the octyl ester of β-aminobutyric acid, The heptyl ester of α-chlorovaleric acid, the heptyl ester of γ-chlorovaleric acid, the octyl ester of β-methylvaleric acid, the heptyl ester of γ-hydroxy valeric acid, The decyl ester of α-bromocaproic acid, the heptyl ester of γ-chlorocaproic acid, the octyl ester of δ-chlorocaproic acid, the decyl ester of α,γ-dimethyl valeric acid, The octyl ester of leucine, the decyl ester of leucine, the decyl ester of α-chloroisocaproic acid, the decyl ester of α-methyl caproic acid, The butanol-2-ester of caprylic acid, the butanol-2-ester of caprinic acid, the octanol-2-ester of caprylic acid, the octanol-2-ester of caprinic acid, The diamyl ester of α-chlorosuccinic acid, the diamyl ester of malic acid, the diheptyl ester of α-methyl-succinic acid, the diheptyl ester of dichlorosuccinic acid, The diamyl ester of α-chloroglutaric acid, the diheptyl ester of α-methylglutaric acid, the dibutyl ester of α-chloroadipic acid.

This application is a continuation-in-part of my application Serial No. 352,587 filed May 1, 1953, now abandoned.

What I claim is:

1. A process for the separation of optical antipodes in a racemic mixture which comprises: preparing a solution containing both urea and a racemic mixture, said racemic mixture being capable of forming urea inclusion compounds with urea by precipitation from said solution; slowly reducing the temperature of said solution and initially precipitating only about 8 to 31% of said racemic mixture as urea inclusion compounds, said precipitated urea inclusion compounds containing predominantly one of said optical antipodes; and separating said initially precipitated urea inclusion compounds containing predominantly one of said optical antipodes from the portion of said racemic mixture remaining in solution which contains predominantly the other of said optical antipodes.

2. A process as claimed in claim 1 for the separation of the optical antipodes in racemic 2-chloroctane.

3. A process for the separation of optical antipodes in a racemic mixture which comprises: preparing a solution containing both urea and a racemic mixture, said racemic mixture being capable of forming urea inclusion compounds with urea by precipitation from said solution; slowly reducing the temperature of said solution and initially precipitating only about 8 to 31% of said racemic mixture as urea inclusion compounds, said precipitated urea inclusion compounds containing predominantly one of said optical antipodes; separating said initially precipitated urea inclusion compounds containing predominantly one of said optical antipodes from the portion of said racemic mixture remaining in solution which contains predominantly the other of said optical antipodes; and separating said precipitated urea inclusion compounds into their components of urea and predominantly said one of the said optical antipodes.

4. A process as claimed in claim 3 for the separation of the optical antipodes in racemic heptyl ester of α-chlorobutyric acid.

5. A process as claimed in claim 3 for the separation of the optical antipodes in racemic diamyl ester of malic acid.

6. A process as claimed in claim 3 wherein the optical antipodes in a racemic mixture of an alkyl ester of an aliphatic carboxylic acid are separated.

7. A process for the separation of optical antipodes in a racemic mixture which comprises: preparing a solution containing both urea and a racemic mixture, said racemic mixture being capable of forming urea inclusion compounds with urea by precipitation from said solution; slowly reducing the temperature of said solution and initially precipitating only about 8 to 31% of said racemic mixture as urea inclusion compounds, said precipitated urea inclusion compounds containing predominantly one of said optical antipodes; separating said initially precipitated urea inclusion compounds containing predominantly one of said optical antipodes from the portion of said racemic mixture remaining in solution which contains predominantly the other of said optical antipodes; separating said precipitated urea inclusion compounds into their components of urea and predominantly said one of the said optical antipodes; and recovering said other of said optical antipodes from the portion of said racemic mixture remaining in solution by adding additional amounts of urea to said solution and precipitating urea inclusion compounds containing predominantly said other of said optical antipodes.

References Cited in the file of this patent

UNITED STATES PATENTS

| 2,594,481 | Bowman et al. | Apr. 29, 1952 |
| 2,632,002 | Gross | Mar. 17, 1953 |
| 2,634,261 | Fetterly | Apr. 7, 1953 |
| 2,658,887 | Arnold et al. | Nov. 10, 1953 |
| 2,662,879 | Foster | Dec. 15, 1953 |
| 2,681,333 | Gorin | June 15, 1954 |
| 2,702,289 | Bowman et al. | Feb. 15, 1955 |

OTHER REFERENCES

English et al.: "Principles of Organic Chemistry," McGraw-Hill, New York, 1949, page 410.

Merck Index (6th ed.), Merck & Co., Rahway, New Jersey, 1952, page 691.